(12) United States Patent
Power et al.

(10) Patent No.: US 8,145,189 B2
(45) Date of Patent: Mar. 27, 2012

(54) TECHNIQUE FOR SECURELY COMMUNICATING INFORMATION

(75) Inventors: Michael J. Power, San Jose, CA (US); Dante Cassanego, Mountain View, CA (US); See Yew Mo, Mountain View, CA (US); Harish K. K. Subramanian, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 998 days.

(21) Appl. No.: 11/769,504

(22) Filed: Jun. 27, 2007

(65) Prior Publication Data

US 2009/0006263 A1    Jan. 1, 2009

(51) Int. Cl.
*H04M 11/00* (2006.01)
*G06Q 20/00* (2006.01)

(52) U.S. Cl. .......... 455/406; 705/51; 455/405; 455/407
(58) Field of Classification Search .................. 705/51, 705/44, 13
See application file for complete search history.

(56) References Cited

U.S. PATENT DOCUMENTS

| | | | |
|---|---|---|---|
| 7,039,389 B2 * | 5/2006 | Johnson, Jr. | 455/406 |
| 7,103,572 B1 * | 9/2006 | Kawaguchi et al. | 705/40 |
| 7,311,246 B2 | 12/2007 | Arisawa | |
| 2002/0114467 A1 * | 8/2002 | Vatanen | 380/270 |
| 2002/0174335 A1 * | 11/2002 | Zhang et al. | 713/168 |
| 2002/0183046 A1 * | 12/2002 | Joyce et al. | 455/414 |
| 2002/0186845 A1 * | 12/2002 | Dutta et al. | 380/247 |
| 2003/0153278 A1 * | 8/2003 | Johnson, Jr. | 455/74 |
| 2004/0029569 A1 * | 2/2004 | Khan et al. | 455/414.1 |
| 2004/0030601 A1 * | 2/2004 | Pond et al. | 705/16 |
| 2004/0147251 A1 * | 7/2004 | Nakayama et al. | 455/414.2 |
| 2006/0056324 A1 * | 3/2006 | Hyyppa et al. | 370/310 |
| 2007/0005774 A1 * | 1/2007 | Singh et al. | 709/227 |
| 2007/0162760 A1 * | 7/2007 | Samuelsson et al. | 713/182 |
| 2008/0116264 A1 * | 5/2008 | Hammad et al. | 235/382 |
| 2008/0167988 A1 * | 7/2008 | Sun et al. | 705/39 |
| 2008/0201212 A1 * | 8/2008 | Hammad et al. | 705/13 |
| 2008/0313079 A1 * | 12/2008 | Van Bosch et al. | 705/44 |
| 2009/0088077 A1 * | 4/2009 | Brown et al. | 455/41.2 |

* cited by examiner

*Primary Examiner* — Evens J Augustin
(74) *Attorney, Agent, or Firm* — Park, Vaughan, Fleming & Dowler LLP (57) ABSTRACT

A system that communicates information is described. During operation, this system receives an encryption key through a first wireless communication technique, wherein the first wireless communication technique includes near field communication. Then, the system communicates a document through a second wireless communication technique, where the document is associated with a financial transaction being conducted with a commercial establishment. Next, the system receives encrypted information through the second wireless communication technique, where the encrypted information is, at least in part, encrypted using the encryption key, and where the second wireless communication technique includes a technique other than near field communication.

26 Claims, 5 Drawing Sheets

CUSTOMER 510-1 | ACCOUNT(S) 512-1 | ACCOUNT PROXIES 514-1 | TIME STAMP(S) 516-1 | ENCRYPTION KEY(S) 518-1 | ...

CUSTOMER 510-2

DOCUMENT 610-1 | TIME STAMP/DATE 612-1 | TRANSACTION ID 614-1 | COMMERCIAL ESTABLISHMENT 616-1 | GOODS EXCHANGED 618-1 | TOTAL VALUE 620-1 | ...

DOCUMENT 610-2

...

TECHNIQUE FOR SECURELY COMMUNICATING INFORMATION

BACKGROUND

The present invention relates to techniques for communicating information.

Fraudulent financial transactions involving stolen personal financial information are becoming increasingly common. This personal financial information is often stolen because of insufficient security in the communication techniques that are used to perform financial transactions. Most existing solutions to these security problems only offer limited protection and can be cumbersome to use. For example, tokens (such as pin codes or passwords) are sometimes used to authorize a given financial transaction. However, such tokens can also be stolen or compromised because the limitations of human memory often results in the use of predictable tokens.

Wireless networks create additional security problems. For example, data packets containing financial information (which may possibly be encrypted) are often communicated between devices via a wireless communication system, such as a wireless local area network (WLAN). Unfortunately, in existing WLANs it is difficult to ensure that transmitted data packets are received (or are only received) by an intended receiver. Consequently, communication between devices may be monitored by an (unknown) third party. Furthermore, when a given financial transaction occurs between unaffiliated parties (such as a customer and a store), information about the encrypted data (such as the transaction information) may need to be exchanged during the communication. However, if the third party intercepts this information the financial transaction may be compromised.

SUMMARY

One embodiment of this invention provides a system that communicates information. During operation, this system receives an encryption key through a first wireless communication technique, wherein the first wireless communication technique includes near field communication. Then, the system communicates a document through a second wireless communication technique, where the document is associated with a financial transaction being conducted with a commercial establishment. Next, the system receives encrypted information through the second wireless communication technique, where the encrypted information is, at least in part, encrypted using the encryption key, and where the second wireless communication technique includes a technique other than near field communication.

In some embodiments, the document includes an invoice for purchasing an item associated with the commercial establishment.

In some embodiments, the financial transaction occurs, at least in part, online.

In some embodiments, the operations of receiving of the encryption key, communicating the document, and receiving of the encrypted information occur between a wireless device associated with a consumer and a computer located remotely from the commercial establishment, where the computer and the commercial establishment may exchange information through another communication channel. For example, the wireless device may include a cellular telephone and/or the other communication channel may include the Internet.

In some embodiments, the operations of receiving of the encryption key, communicating the document, and receiving of the encrypted information occur between the wireless device associated with a consumer and a point-of-sale terminal associated with the commercial establishment.

In some embodiments, the encrypted information includes one or more identifiers associated with a consumer, where the encrypted information includes authorization by the consumer for the financial transaction. For example, the one or more identifiers may include at least a portion of an account associated with the consumer and/or a proxy for an account associated with the consumer.

In some embodiments, the system decrypts the encrypted information using the encryption key. Then, the system: provides authorization for the financial transaction by the commercial establishment; submits the document, the decrypted information, and the authorization by the commercial establishment to a financial institution; and receives approval for the financial transaction from the financial institution.

In some embodiments, the system: provides authorization for the financial transaction by the commercial establishment; submits the document, the encrypted information, the encryption key, and the authorization by the commercial establishment to the financial institution; and receives approval for the financial transaction from the financial institution.

In some embodiments, the first wireless communication technique operates over a distance which is less than a pre-defined distance. Moreover, in some embodiments, the pre-defined distance is approximately 50 cm.

In some embodiments, the document is communicated and the encrypted information is received over a distance which is greater than the pre-defined distance.

Moreover, in some embodiments the second wireless communication technique: is compatible with the Bluetooth® protocol; includes cellular communication; and/or is compatible with an IEEE 802.11 communication standard (such as WiFi).

In some embodiments, the encryption key is a public key used in a public-key/private-key cryptography technique.

In some embodiments, the encryption key is valid during a pre-defined time interval.

Another embodiment provides a method for communicating the information. This method may perform at least some of the above-described operations.

Another embodiment provides a computer program product for use in conjunction with the system. This computer program product may include instructions corresponding to at least some of the above-described operations.

Another embodiment provides a wireless device. This device may be configured to initiate a session by communicating the encryption key through the first wireless communication technique, wherein the first wireless communication technique includes near field communication. Then, the device receives the document through the second wireless communication technique. Next, the device requests a token from the consumer conducting the financial transaction. After receiving the token, the device provides the encrypted information through the second wireless communication technique. Note that the second wireless communication technique includes a technique other than near field communication.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a device, a computer system, a method, and a computer program product (i.e., software) for use with the computer system are described. These devices, systems, software, and processes may be used to securely communicate information associated with one or more financial transactions between a customer and a commercial establishment. Note that the commercial establishment may be proximate to the customer (such as a store) or remotely located (such as during an on-line transaction).

In particular, the customer may provide one or more encryption keys to the commercial establishment through a first wireless communication technique that occurs over a short distance (such as approximately 50 cm or less). Then, the commercial establishment may provide the customer with a document (such as an invoice) that is associated with the financial transaction, and the customer may provide authorization for the financial transaction. Note that the providing of the document and the authorization may utilize a second wireless communication technique that occurs over a longer distance (such as more than approximately 50 cm).

After receiving the authorization from the customer, the commercial establishment may submit information associated with the financial transaction to a financial institution for approval. This information may include: at least some of the information received from the customer; at least some of the information in the document; and/or authorization for the financial transaction by the commercial establishment.

Note that in some embodiments the one or more encryption keys are used to decrypt at least a portion of any encrypted information received from the customer prior to submitting the information to the financial institution. However, in some embodiments the one or more encryption keys are provided to the financial institution, which may use the one or more encryption keys to decrypt at least a portion of any encrypted information forward to the financial institution by the commercial establishment after being received from the customer.

While financial transactions are used as an illustrative example in the discussion that follows, the techniques described may be used to facilitate secure communication of information associated with medical transactions (such as those between a patient and a heath care provider or a pharmacy) and/or security access.

These techniques may be implemented as a stand-alone software application or as a program module or subroutine in another application, such as financial-transaction software in a point-of-sale (POS) terminal (such as a cash register). Furthermore, at least a portion of the program may be configured to execute on: a client device or computer (such as a personal computer, a laptop computer, cell phone, PDA, or other device capable of manipulating computer readable data), or remotely from a client computer via computing systems over a network (such as the Internet, Intranet, LAN, WAN, MAN, or combination of networks, or other technology enabling communication between computing systems). Therefore, the communicated information may be stored locally (for example, on a local computer) and/or remotely (for example, on a computer or server that is accessed via a network).

Figure 1A:
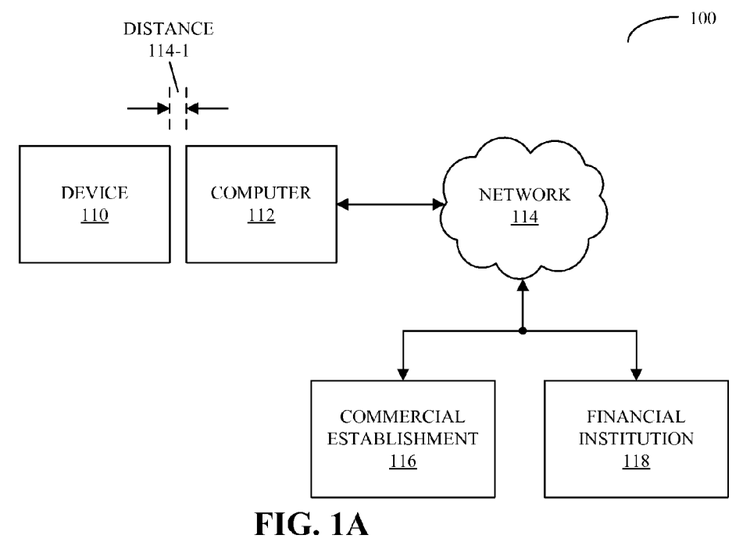
FIG. 1A is a block diagram illustrating a system in accordance with an embodiment of the present invention.

We now describe embodiments of systems, devices and processes for communicating information. FIG. 1A presents a block diagram illustrating an embodiment of a system 100. Within this system, a customer may initialize a session by first providing one or more encryption keys (such as one or more public keys that are used in a public-key/private-key cryptographic technique) using device 110. In particular, the customer brings the device 110 within a distance 114-1 of a computer 112, and the one or more encryption keys are communicated to the computer 112 through a first wireless communication technique. Note that in some embodiments the computer 112 also communicates one or more additional encryption keys to the device 110 through the first wireless communication technique.

In an exemplary embodiment, the device 110 is a cellular telephone or includes the functionality of a cellular telephone, and the computer 112 is a POS terminal in or proximate to a commercial establishment 116 (such as a store). However, in some embodiments the computer 112 is a personal computer coupled to a commercial establishment 116 (such as vendor) via a network 114 (such as the Internet). Moreover, the first wireless communication technique may include near field communication and the distance 114-1 may be less than 50 cm. Note that the term "near field communication" refers to a short-range (hands width) wireless technology mainly aimed at usage in mobile phones. For example, a number of standards have been developed to cover near field communication technologies, such as ECMA-340 and ISO/IEC 18092.

Figure 1B:
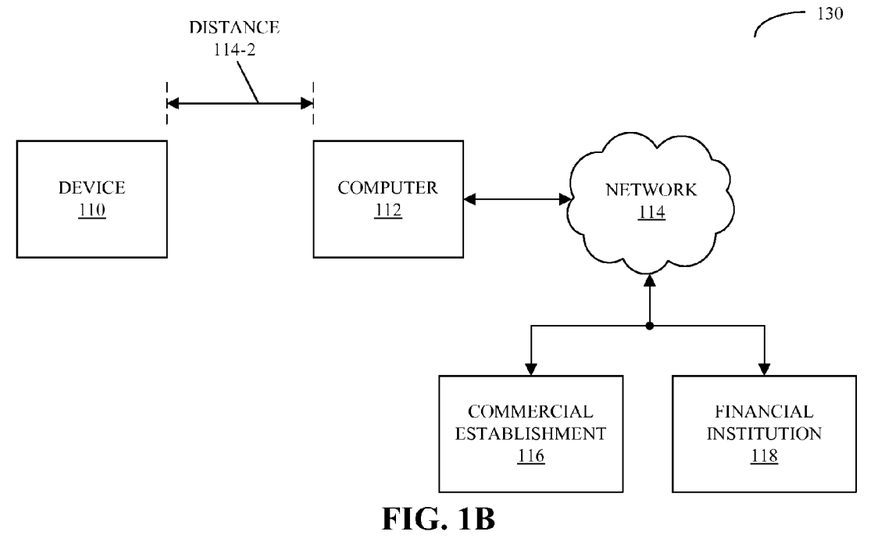
FIG. 1B is a block diagram illustrating a system in accordance with an embodiment of the present invention.

As shown in FIG. 1B, which presents a block diagram illustrating an embodiment of a system 130, after the customer has provided the one or more encryption keys the device 110 may be positioned a distance 114-2 (which is greater than the distance 114-1 in FIG. 1A) from the computer 112.

Then, the computer 112 provides a document, such as an invoice associated with a financial transaction (for example, for the purchase of an item), from the commercial establishment 116 to the device 110 through a second wireless communication technique. In exemplary embodiments, the second wireless communication technique: is compatible with the Bluetooth® protocol; includes cellular communication; and/or is compatible with an IEEE 802.11 communication standard (such as WiFi).

In some embodiments, after receiving the document the device 110 optionally decrypts at least a portion of the document using the one or more additional encryption keys provided by the computer 112 (such as a first public encryption key associated with a first private key). Moreover, the customer may authorize the financial transaction and communicate this to the computer 112 through the second wireless communication technique. For example, the customer may electronically 'sign' the document, and the device 110 may encrypt at least a portion of the signed document (such as the authorization) using the one or more encryption keys (such as a second encryption key associated with a second private key) prior to transmitting the document to the computer 112. Note that in some embodiments the first private key and the second private key are the same. For example, the device 110 and/or the computer 112 may be preconfigured with a common private key.

In some embodiments the customer is authenticated prior to authorizing the financial transaction. For example, 2-factor authentication may be used, where the factors include the device 110 and a token (such as a password) provided by the customer to the device 110. Moreover, in some embodiments the customer provides one or more identifiers along with the authorized document. For example, the one or more identifiers may be associated with the customer, such as: a portion of an account identifier, a proxy for the account identifier, and/or a pointer to customer account information that is stored remotely (for example, at a financial institution 118). Thus, in some embodiments only harmless information is communicated and/or exchanged between the device 110 and the computer 112.

Computer 112 may forward the authorized document to the commercial establishment 116 via the network 114. In some embodiments, this forwarding is from a POS terminal in the commercial establishment 116 to a central computer or server in the commercial establishment 116. Moreover, the commercial establishment may decrypt at least a portion of the authorized document using the previously received one or more encryption keys (such as the second public key). However, as discussed below, in some embodiments such decrypting of encrypted information received from the device 110 is performed by the financial institution 118.

Then, the commercial establishment 116 may also authorize the financial transaction and send it to the financial institution 118 (via the network 114) for approval. For example, the commercial establishment 116 may electronically 'sign' the document, and may encrypt at least a portion of the resulting document (such as the authorizations and the one or more customer identifiers) using the first private key (which is associated with the commercial establishment 116) prior to transmitting it to the financial institution 118.

Note that the document may include: a total value of the financial transaction, a time of the financial transaction, a financial transaction identifier, a description of the item(s) purchased or good(s) exchanged, the authorizations, and/or the one or more customer identifiers (such as an account number). Moreover, note that in some embodiments either or both of the authorizations (such as the electronic signatures) may be associated with a given financial transaction. As such, this information may not be reused even if it is intercepted by a third party.

Next, the financial institution 118: authenticates both the customer and the commercial establishment 116; approves the financial transaction; and communicates the approval to the commercial establishment 116. In some embodiments the financial institution 118 first decrypts the received document using the first public key and/or the second public key (which may be provided to the financial institution 118 by the commercial establishment 116).

This technique for initiating a session and communicating data during the session may help improve the security of communications between the device 110 and the computer 112. In particular, the first wireless communication technique (i.e., the shorter-range communication technique) may be used to provide sensitive encryption information (such as the one or more encryption keys), and the second wireless communication technique (i.e., the longer-range communication technique) may then be used with a reduced or eliminated risk that a third party can monitor the communication. For example, the third party may be unable to decrypt encrypted information that is communicated. Moreover, once the one or more encryption keys (and/or the one or more additional encryption keys) are provided (and/or exchanged), private authenticated communication may be used between the device 110 and the computer 112, so that other devices that lack the necessary private keys will not be able to pretend that they are either the device 110 and/or the computer 112 during the communication. Furthermore, note that once the one or more encryption keys and/or the one or more additional encryption keys are provided by the device 110 and/or the computer 112, the customer is not required to hold device 110 in close proximity to the computer 112, thereby increasing customer convenience.

In some embodiments, the one or more encryption keys and/or the one or more additional encryption keys may be: 1-shot keys (i.e., they can each be used once); may be cycled through over time (for example based on a pseudorandom sequence generator); may be synchronized sequentially based on a timing or synchronization signal; and/or may be routinely provided to the device 110 and/or the computer 112 (for example, daily). Thus, in some embodiments the one or more encryption key and/or the one or more additional encryption keys are only valid during a pre-defined time interval.

As noted previously, in some embodiments the described technique is used to facilitate financial transactions that are performed on-line. For example, a cellular telephone may communicate one or more encryption keys with a personal computer through the first wireless communication technique, and may communicate the document through the second wireless communication technique. Furthermore, the personal computer may interact with a server computer associated with a commercial establishment 116 via the network 114 (such as the Internet). In this way, the customer may not have to type in sensitive information or to transmit such information in the clear.

In some embodiments the system 100 (FIG. 1A) and/or 130 include: fewer or additional components; two or more components are combined into a single component; and/or a position of one or more components may be changed. While the preceding discussion has used a commercial establishment (such as the commercial establishment 116) as an illustrative example, in other embodiments these techniques may be used to secure communication with a non-commercial establishment.

Moreover, while these techniques may be implemented using software that is resident on the computer 112, other embodiments may utilize a software tool that is embedded in a web page (once again, either as a stand-alone application or as a portion of another application). This web page may be provided by a server via network 114. In an exemplary embodiment, the software tool is a software package written in JavaScript™ (i.e., the software tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the software tool may include programs or procedures containing JavaScript, ECMAScript instructions, VBScript instructions, or instructions in another programming language suitable for rendering by a browser or another client application on the computer 110.

Figure 2:
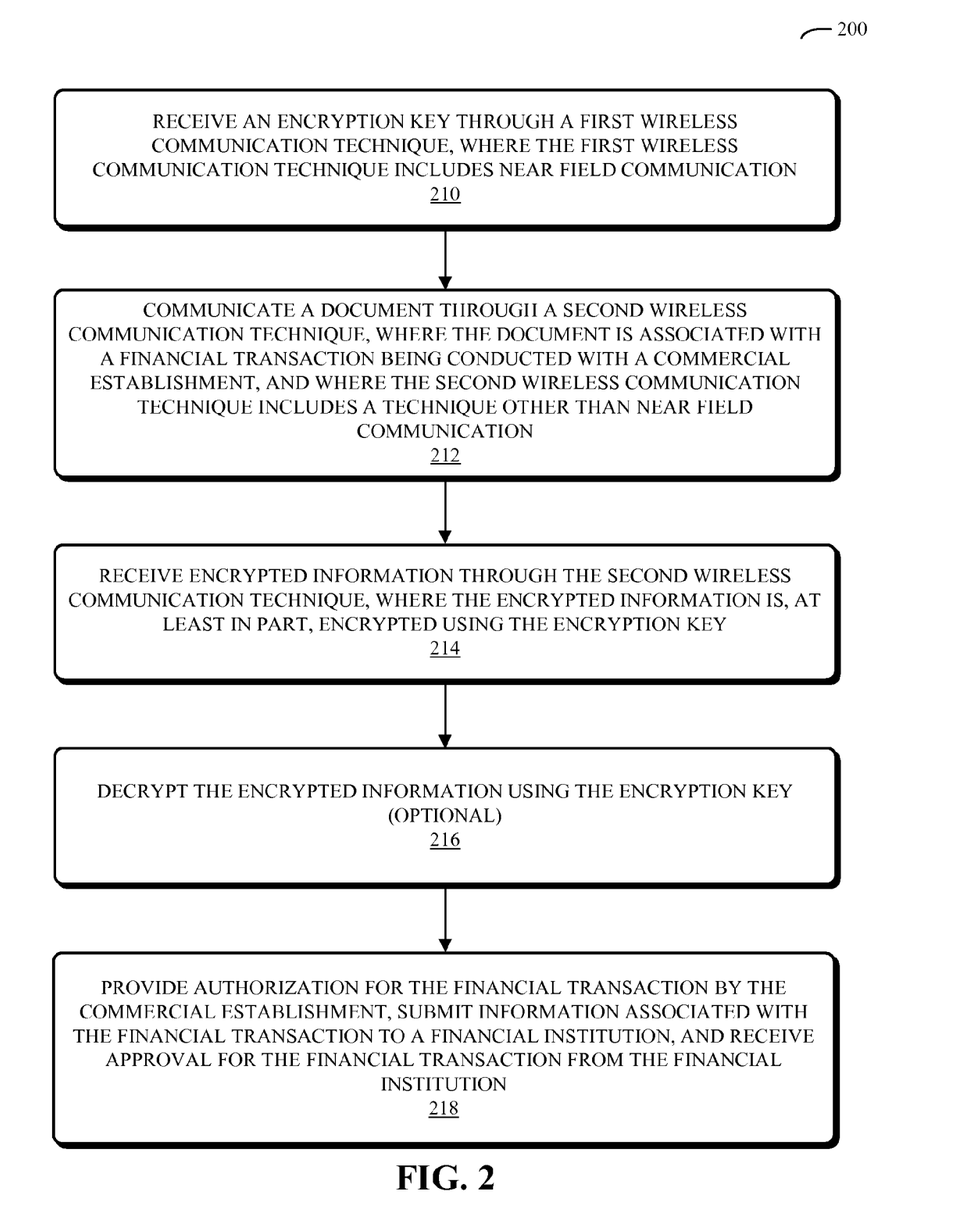
FIG. 2 is a flow chart illustrating a method for communicating information in accordance with an embodiment of the present invention.

We now discuss methods for communicating information. More specifically, FIG. 2 presents a flow chart illustrating an embodiment of a method 200 for communicating information, which may be implemented in a system (such as the system 100 in FIG. 1A and/or 130 in FIG. 1B). During operation, this system receives an encryption key through a first wireless communication technique, where the first wireless communication technique includes near field communication (210). Then, the system communicates a document through a second wireless communication technique (212), where the document is associated with a financial transaction being conducted with a commercial establishment, and where the second wireless communication technique includes a technique other than near field communication.

Next, the system receives encrypted information through the second wireless communication technique (214), where the encrypted information is, at least in part, encrypted using the encryption key. In some embodiments, the system optionally decrypts the encrypted information using the encryption key (216). Then, the system: provides authorization for the financial transaction by the commercial establishment; submits information associated with the financial transaction; and receives approval for the financial transaction from the financial institution (218).

For example, the information associated with the financial transaction may include: the document, the optional decrypted information, and the authorization by the commercial establishment (i.e., at least a portion of the decryption is performed by the commercial establishment). However, in some embodiments the information associated with the financial transaction includes: the document, the encrypted information, the encryption key, and the authorization by the commercial establishment (i.e., at least a portion of the decryption is performed by the financial institution).

Note that in some embodiments there may be: additional or fewer operations; the order of the operations may be changed; and two or more operations may be combined into a single operation.

In an exemplary embodiment a cellular telephone is used to communicate credit card information with: a POS terminal, a credit-card processing unit, and/or a computer (henceforth referred to as a computer). Note that while the first wireless communication technique is used, the customer only needs to hold the cellular telephone close to the computer for a brief period of time (for example, a few milliseconds). Then, the remainder of the communication during the financial transaction can occur over a longer distance.

After exchanging the one or more encryption keys and/or the one or more additional encryption keys (such as public keys) with each other, the cellular telephone and the computer can identify each other based on these public keys. Then, using Bluetooth® these devices can implement private authenticated communication via the exchanged public keys. Other devices, which do not have the private key associated with the public key(s), will be unable to listen in to the communicated information, or pretend to be either member in the conversation.

Other exemplary embodiments include: communication between two or more cellular telephones (for example, to exchange contact information or financial-transaction information); communication 2-factor authentication information between a cellular telephone and a security device (such as a door); communication between a cellular telephone and a computer (for example, provide 2-factor authentication information to access the computer); and/or using a cellular telephone and a ticketing device to buy tickets and update ticket balances.

Figure 3:
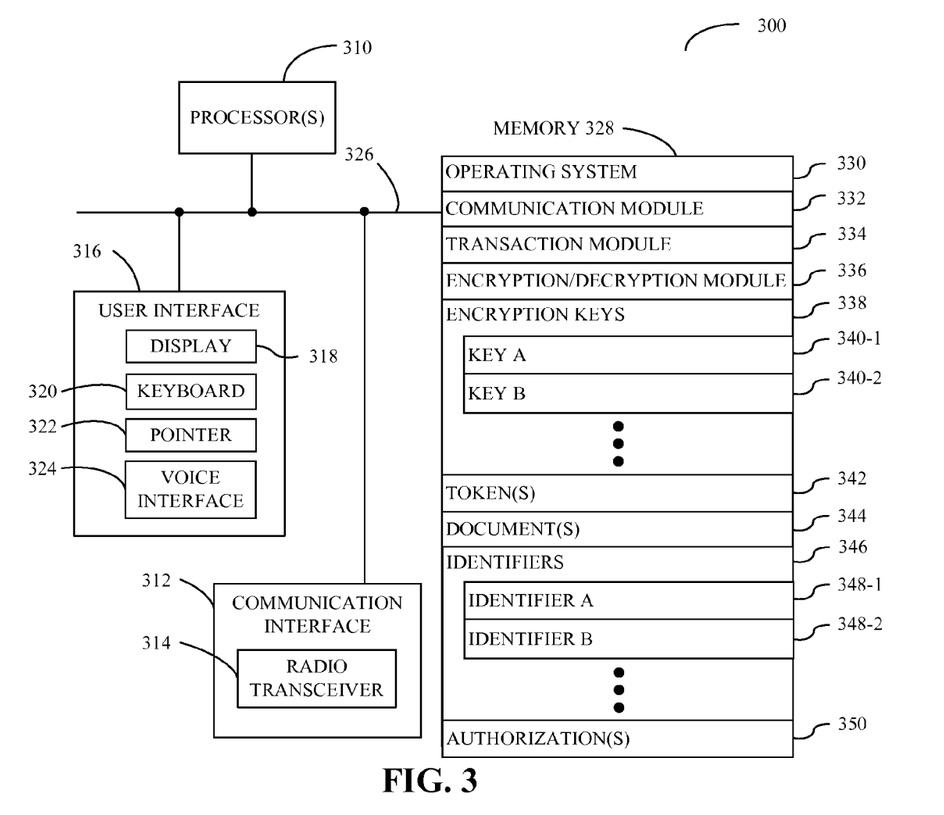
FIG. 3 is a block diagram illustrating a device in accordance with an embodiment of the present invention.

We now describe devices and systems for communicating information. FIG. 3 presents a block diagram illustrating an embodiment of a device 300 (such as the device 110 in FIGS. 1A and 1B). Device 300 includes: one or more processors 310, a communication interface 312, a user interface 316, and one or more signal lines 326 coupling these components together. Note that the one or more processing units 310 may support parallel processing and/or multi-threaded operation; the communication interface 312 may include a radio transceiver 314 and/or may have a persistent communication connection; and the one or more signal lines 326 may constitute a communication bus. Moreover, the user interface 316 may include: a display 318, a keyboard 320, a pointer 322 (such as a mouse), and/or a voice interface 324.

Memory 328 in the device 300 may include volatile memory and/or non-volatile memory. More specifically, memory 328 may include: ROM, RAM, EPROM, EEPROM, FLASH, one or more smart cards, one or more magnetic disc storage devices, and/or one or more optical storage devices. Memory 328 may store an operating system 330 that includes procedures (or a set of instructions) for handling various basic system services for performing hardware dependent tasks. Memory 328 may also store communication procedures (or a set of instructions) in a communication module 332. These communication procedures may be used for communicating with one or more computers and/or servers, including computers and/or servers that are remotely located with respect to the device 300.

Memory 328 may include multiple program modules (or a set of instructions), including transaction module 334 (or a set of instructions) and/or encryption/decryption module 336 (or a set of instructions). Transaction module 334 may provide and/or receive one or more encryption keys 338 (such as key A 340-1 and/or key B 340-2) to a computer system (such as the computer system 400 described below with reference to FIG. 4) through the first wireless communication technique. Furthermore, transaction module 334 may receive one or more documents 344 from the computer system through the second wireless communication technique.

When a document is received (and is optionally decrypted), transaction module 334 may prompt a user of the device 300 for one or more tokens 342. After receiving the one or more tokens 342, device 300 may provide one or more identifiers 346 (such as identifier A 348-1 and/or identifier B 348-2) and/or one or more authorizations 350 to the computer system through the second wireless communication technique. Note that at least a portion of the information provided may be encrypted, at least in part, using one or more of the encryption keys 338.

Instructions in the various modules in the memory 328 may be implemented in a high-level procedural language, an object-oriented programming language, and/or in an assembly or machine language. The programming language may be compiled or interpreted, i.e., configurable or configured to be executed by the one or more processing units 310.

Although the device 300 is illustrated as having a number of discrete components, FIG. 3 is intended to provide a functional description of the various features that may be present in the device 300 rather than as a structural schematic of the embodiments described herein. In some embodiments, some or all of the functionality of the device 300 may be implemented in one or more ASICs and/or one or more digital signal processors DSPs.

Device 300 may include: fewer components or additional components, two or more components may be combined into a single component, and/or a position of one or more components may be changed. In some embodiments the functionality of the device 300 may be implemented more in hardware and less in software, or less in hardware and more in software, as is known in the art.

Note that in some embodiments, sensitive information (such as one or more encryption keys 338, one or more tokens 342, one or more identifiers 346, and/or one or more authorizations 350) may be encrypted, so that if device 300 is lost the associated encryption key(s) and the device 300 may be disabled, thereby securing the information without requiring the associated accounts to be disabled or changed.

Figure 4:
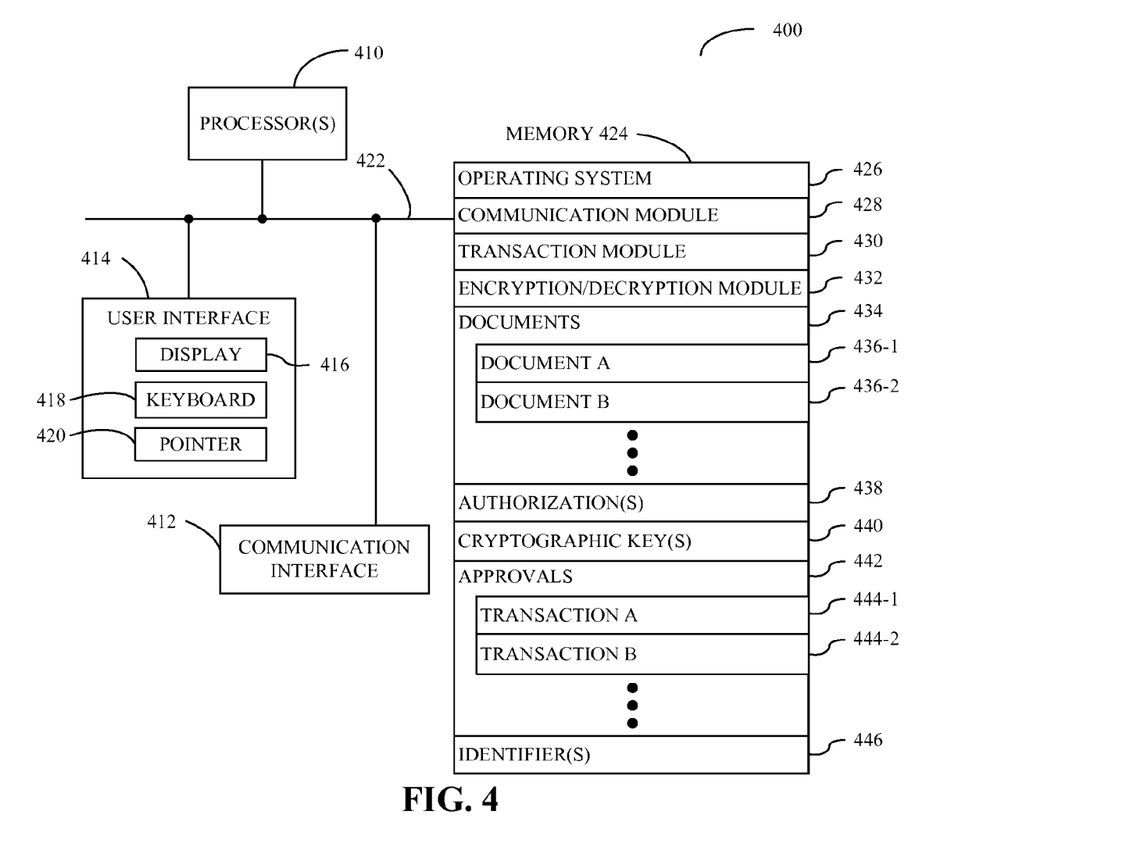
FIG. 4 is a block diagram illustrating a computer system in accordance with an embodiment of the present invention.

FIG. 4 presents a block diagram illustrating an embodiment of a computer system 400 (which may be used in system 100 in FIG. 1A and system 130 in FIG. 1B). Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. Memory 424 may also store communication procedures (or a set of instructions) in a communication module 428. These communication procedures may be used for communicating with one or more computers and/or servers, including computers and/or servers that are remotely located with respect to the computer system 400.

Memory 424 may include multiple program modules (or a set of instructions), including transaction module 430 (or a set of instructions) and/or encryption/decryption module 432 (or a set of instructions). Transaction module 430 may optionally provide one or more additional encryption keys in cryptographic keys 440 to a device (such as the device 300 in FIG. 3) through the first wireless communication technique, and may provide one or more documents 434 (such as document A 436-1 and/or document B 436-2) to this device through the second wireless communication technique.

Moreover, transaction module 430 receives information from the device, such as: one or more encryption keys in cryptographic keys 440 through the first wireless communication technique; and one or more authorizations 438 and one or more identifiers 446 (such as customer-account information) through the second wireless communication technique. In some embodiments, encryption/decryption module 432 optionally encrypts at least a portion of the information provided to the device and/or decrypts at least some of the information received from the device using one or more of the cryptographic keys 440.

Furthermore, transaction module 430 may provide information about one or more financial transactions to a financial institution. This provided information may include: authorizations 438 from the customer and the commercial establishment; identifiers 446 for the customer and the commercial establishment; information in one or more documents 434; and/or one or more cryptographic keys 440. After processing, the financial institution may provide one or more approvals 442 (such as an approval for transaction A 444-1 and/or an approval for transaction B 444-2).

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processing units 410.

Although the computer system 400 is illustrated as having a number of discrete components, FIG. 4 is intended to provide a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include: fewer components or additional components, two or more components may be combined into a single component, and/or a position of one or more components may be changed. In some embodiments the functionality of the computer system 400 may be implemented more in hardware and less in software, or less in hardware and more in software, as is known in the art.

Figure 5:
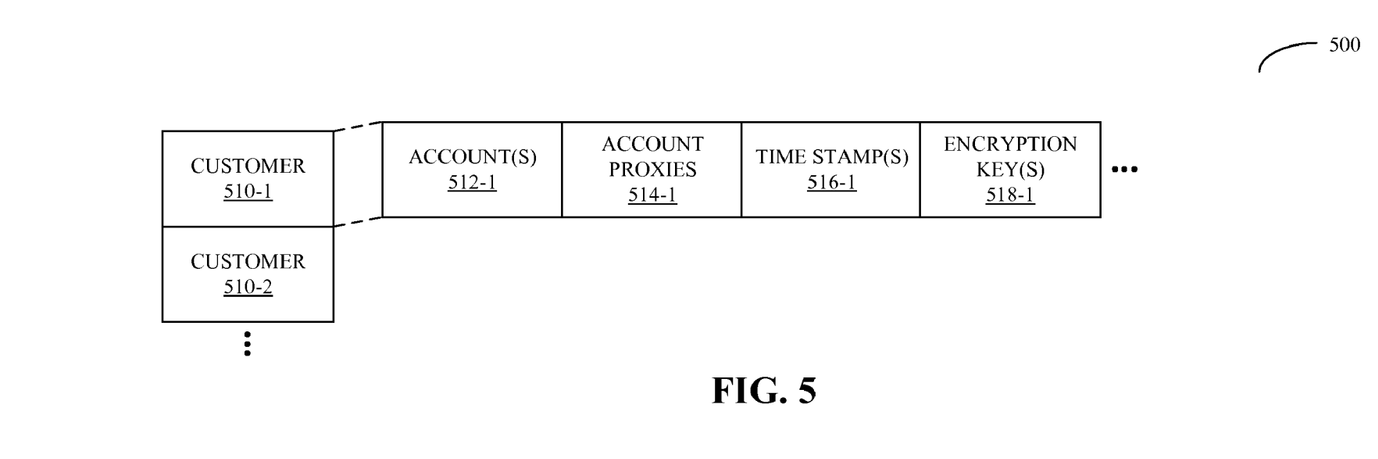
FIG. 5 is a block diagram illustrating a data structure in accordance with an embodiment of the present invention.

We now discuss data structures that may be used in: system 100 (FIG. 1A), system 130 (FIG. 1B), device 300 (FIG. 3), and/or computer system 400. FIG. 5 presents a block diagram illustrating an embodiment of a data structure 500. This data structure may include multiple records for different customers 510. A record for a given customer, such as customer 510-1, may include information, such as: one or more accounts 512-1 (such as an account number), one or more account proxies 514-1 (such as a dummy code associated with one or more of the accounts 512-1), one or more time stamps 516-1, and/or one or more encryption keys 518-1 (which may be valid during a time interval proximate and/or including one or more of the time stamps 516-1). Note that the data structure 500 may be used by a commercial establishment and/or a financial institution during the financial transaction.

Figure 6:
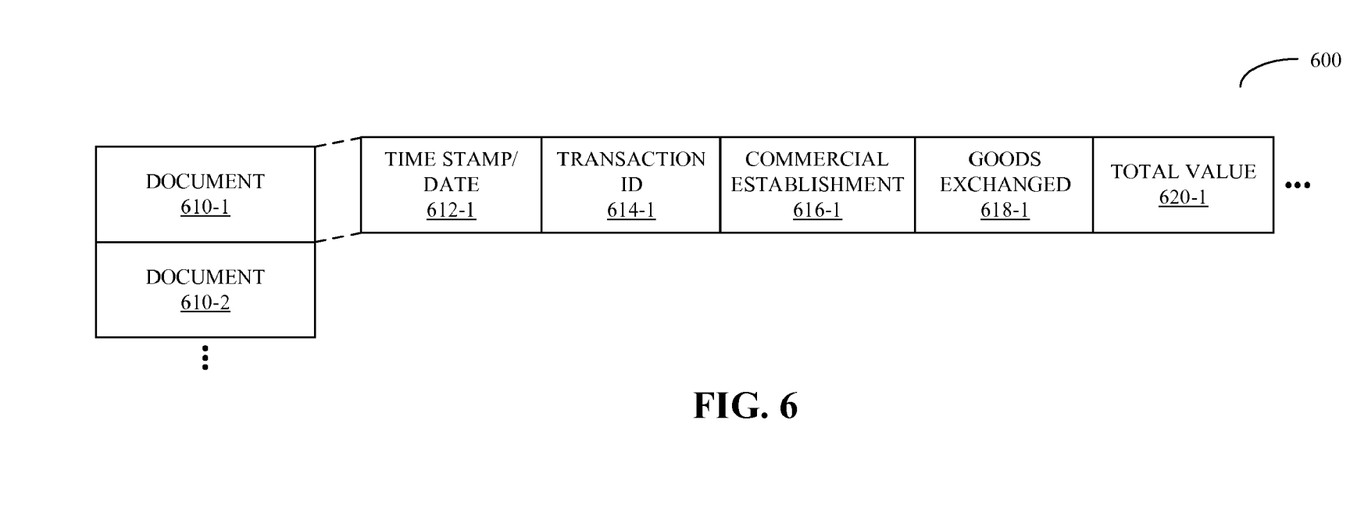
FIG. 6 is a block diagram illustrating a data structure in accordance with an embodiment of the present invention.

FIG. 6 presents a block diagram illustrating an embodiment of a data structure 600. This data structure may include information associated with multiple documents 610. A given document, such as document 610-1, may include information, such as: a time stamp and/or a date 612-1, a transaction identifier 614-1, a commercial establishment 616-1, goods exchanged 618-1 during the financial transaction, and/or a total value 620-1 of the financial transaction.

Note that that in some embodiments of the data structures 500 (FIG. 5) and/or 600 there may be: fewer or additional components; two or more components may be combined into a single component; and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating information securely between a client device and a computer, comprising:
   receiving one or more encryption keys at the computer through a first wireless communication technique that includes near field communication, wherein the first wireless communication technique operates over a first distance;
   communicating a document to the client device from the computer through a second wireless communication technique that includes a technique other than near field communication, wherein the second wireless communication technique operates over a second distance which is greater than the first distance, and wherein the document is associated with a financial transaction conducted with a commercial establishment;
   receiving the document at the client device through the second wireless communication technique;
   authorizing the document by a consumer at the client device to generate an authorized document, wherein the authorized document includes an authorization by the consumer for the financial transaction, and wherein the authorized document is, at least in part, encrypted using the one or more encryption keys;
   communicating the authorized document from the client device to the computer through the second wireless communication technique; and
   receiving the authorized document at the computer through the second wireless communication technique,
   wherein the authorized document is used to authenticate the consumer and to approve the financial transaction by a financial institution.

2. The method of claim 1, wherein in the document includes an invoice for purchasing an item associated with the commercial establishment.

3. The method of claim 1, wherein the financial transaction occurs, at least in part, online.

4. The method of claim 1, wherein the computer includes a computer in the commercial establishment;
   wherein the one or more encryption keys and the authorized document are received from, and the document and the authorization are communicated to, a computer located remotely from the commercial establishment; and
   wherein the computer in the commercial establishment and the remotely located computer exchange the one or more encryption keys, the authorized document, the document, and the authorization through another communication channel.

5. The method of claim 4, wherein the client device includes a cellular telephone.

6. The method of claim 1, wherein receiving of the one or more encryption keys, communicating the document, and receiving of the authorized document occur between a wireless device associated with the consumer and a point-of-sale terminal associated with the commercial establishment.

7. The method of claim 6, wherein the wireless device includes a cellular telephone.

8. The method of claim 1, wherein the authorized document includes one or more identifiers associated with the consumer.

9. The method of claim 8, wherein the one or more identifiers include at least a portion of an account associated with the consumer.

10. The method of claim 8, wherein the one or more identifiers include a proxy for an account associated with the consumer.

11. The method of claim 8, further comprising decrypting the authorized document using the one or more encryption keys.

12. The method of claim 11, further comprising:
    providing authorization for the financial transaction by the commercial establishment;
    submitting the document, the decrypted authorized document, and the authorization by the commercial establishment to a financial institution; and
    receiving approval for the financial transaction from the financial institution.

13. The method of claim 8, further comprising:
    providing authorization for the financial transaction by the commercial establishment;
    submitting the document, the authorized document, the one or more encryption keys, and the authorization by the commercial establishment to a financial institution; and
    receiving approval for the financial transaction from the financial institution.

14. The method of claim 1, wherein the first wireless communication technique operates over a distance which is less than a pre-defined distance.

15. The method of claim 14, wherein the pre-defined distance is approximately 50 cm.

16. The method of claim 14, wherein the document is communicated and the authorized document is received over a distance which is greater than the pre-defined distance.

17. The method of claim 1, wherein the second wireless communication technique is compatible with the Bluetooth® protocol.

18. The method of claim 1, wherein the second wireless communication technique includes cellular communication.

19. The method of claim 1, wherein the second wireless communication technique is compatible with an IEEE 802.11 communication standard.

20. The method of claim 1, wherein the encryption key is a public key used in a public-key/private-key cryptography technique.

21. The method of claim 1, wherein the one or more encryption keys are valid during a pre-defined time interval.

22. A computer system, comprising:
    a processor;
    a memory;
    a program module, wherein the program module is stored in the memory and configurable to be executed by the processor, the program module including:
      instructions for receiving one or more encryption keys at a computer through a first wireless communication technique that includes near field communication, wherein the first wireless communication technique operates over a first distance;
      instructions for communicating a document to a client device from the computer through a second wireless communication technique that includes a technique other than near field communication, wherein the second wireless communication technique operates over a second distance which is greater than the first distance, and wherein the document is associated with a financial transaction conducted with a commercial establishment;
      instructions for receiving the document at the client device through the second wireless communication technique;

instructions for authorizing the document by a consumer at the client device to generate an authorized document, wherein the authorized document includes an authorization by the consumer for the financial transaction, and wherein the authorized document is, at least in part, encrypted using the one or more encryption keys;

instructions for communicating the authorized document from the client device to the computer through the second wireless communication technique; and instructions for receiving the authorized document at the computer through the second wireless communication technique, wherein the authorized document is used to authenticate the consumer and to approve the financial transaction by a financial institution.

23. A computer program product for use in conjunction with a computer system, the computer program product comprising a computer-readable storage medium and a computer-program mechanism embedded therein communicating information, the computer-program mechanism including:

instructions for receiving one or more encryption keys at a computer through a first wireless communication technique that includes near field communication, wherein the first wireless communication technique operates over a first distance;

instructions for communicating a document to a client device from the computer through a second wireless communication technique that includes a technique other than near field communication, wherein the second wireless communication technique operates over a second distance which is greater than the first distance, and wherein the document is associated with a financial transaction conducted with a commercial establishment;

instructions for receiving the document at the client device through the second wireless communication technique;

instructions for authorizing the document by a consumer at the client device to generate an authorized document, wherein the authorized document includes an authorization by the consumer for the financial transaction, and wherein the authorized document is, at least in part, encrypted using the one or more encryption keys;

instructions for communicating the authorized document from the client device to the computer through the second wireless communication technique; and instructions for receiving the authorized document at the computer through the second wireless communication technique, wherein the authorized document is used to authenticate the consumer and to approve the financial transaction by a financial institution.

24. The computer program product of claim 23, wherein the computer includes a computer in the commercial establishment;

wherein the one or more encryption keys and the authorized document are received from, and the document and the authorization are communicated to, a computer located remotely from the commercial establishment; and wherein the computer in the commercial establishment and the remotely located computer exchange the one or more encryption keys, the authorized document, the document, and the authorization through another communication channel.

25. The computer program product of claim 23, wherein receiving of the one or more encryption keys, communicating the document, and receiving of the authorized document occur between a wireless device associated with the consumer and a point-of-sale terminal associated with the commercial establishment.

26. A wireless device, comprising:

a transceiver configured to communicate information;

a processor;

a memory configured to store one or more encryption keys and encrypted information; and a program module, wherein the program module is stored in the memory and configurable to be executed by the processor, the program module including:

instructions for initiating a session by communicating the one or more encryption keys between the wireless device and a computer through a first wireless communication technique that includes near field communication, wherein the first wireless communication technique operates over a first distance;

instructions for receiving a document at the wireless device from the computer through a second wireless communication technique that includes a technique other than near field communication, wherein the second wireless communication technique operates over a second distance which is greater than the first distance, and wherein the document is associated with a financial transaction conducted with a commercial establishment;

instructions for requesting a token from a consumer conducting the financial transaction;

instructions for receiving the token;

instructions for receiving the document at the wireless device through the second wireless communication technique;

instructions for authorizing the document by the consumer at the wireless device to generate an authorized document, wherein the authorized document includes an authorization by the consumer for the financial transaction, and wherein the authorized document is, at least in part, encrypted using the one or more encryption keys;

instructions for communicating the authorized document from the wireless device to the computer through the second wireless communication technique; and instructions for providing the authorized document through the second wireless communication technique after the token is received, wherein the authorized document is used to authenticate the consumer and to approve the financial transaction by a financial institution.

* * * * *